(12) United States Patent
Ishihara et al.

(10) Patent No.: US 6,663,036 B1
(45) Date of Patent: Dec. 16, 2003

(54) MAGNETIC TAPE CARTRIDGE

(75) Inventors: Yusuke Ishihara, Kanagawa-ken (JP); Hideaki Shiga, Kanagawa-ken (JP); Kiyoo Morita, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/913,733

(22) PCT Filed: Feb. 10, 2000

(86) PCT No.: PCT/JP00/00738

§ 371 (c)(1),
(2), (4) Date: Dec. 5, 2001

(87) PCT Pub. No.: WO00/49615

PCT Pub. Date: Aug. 24, 2000

(30) Foreign Application Priority Data

Feb. 17, 1999 (JP) .............................................. 11-038663

(51) Int. Cl.⁷ ............................................. G11B 23/107
(52) U.S. Cl. ................................... 242/348.2; 360/132
(58) Field of Search ........................ 242/348.2; 360/132

(56) References Cited

U.S. PATENT DOCUMENTS 4,694,557 A    9/1987  Gelardi 5,465,187 A   11/1995  Hoge et al.

FOREIGN PATENT DOCUMENTS

| EP | 0 926 675 A1 | 6/1999 | |
|----|---|---|---|
| JP | 11-232826 | 8/1999 | ......... G11B/23/107 |
| JP | 11-232838 | 8/1999 | ........... G11B/27/00 |
| WO | WO 99/52107 A1 | 10/1999 | |
| WO | WO 00/31739 A1 | 6/2000 | |

OTHER PUBLICATIONS

Abstract 11–232826, Aug. 27, 1999.

Abstract 11–232838, Aug. 27, 1999.

International Search Report.

*Primary Examiner*—John Q. Nguyen
(74) *Attorney, Agent, or Firm*—Sughrue Mion, PLLC

(57) ABSTRACT

A magnetic tape cartridge comprising a single reel with magnetic tape wound thereon, a cartridge case for rotatably housing the single reel, a leader pin having a tape clamp portion on which the magnetic tape is wound, and a clamp member with a C cross section that has an axial slit. The leader pin is affixed to a leading end of the magnetic tape by elastically fitting the clamp member onto the tape clamp portion of the leader pin. A sheet member for enhancing a coefficient of friction is interposed at least between the magnetic tape and the tape clamp portion.

3 Claims, 9 Drawing Sheets

PRIOR ART

MAGNETIC TAPE CARTRIDGE

FIELD OF THE INVENTION

The present invention relates to a magnetic tape cartridge, in which a single tape reel with magnetic tape wound thereon is rotatably housed within a cartridge case, and in which a leader pin for pulling the magnetic tape out of the cartridge case is affixed to the leading end of the magnetic tape.

BACKGROUND OF THE INVENTION

In existing magnetic tape cartridges, which are being used as storage media employed in external storage units for computers, etc., there is known a type where a single reel with magnetic tape wound thereon is rotatably housed within a cartridge case. This magnetic tape is employed to archive data for computers, etc. Since important information has been stored, the magnetic cartridge is constructed so that problems, such as tape jamming, etc., do not occur and that the magnetic tape is not pulled out of the cartridge case unexpectedly.

Also, as shown in FIGS. 1, 4, etc., of Japanese Unexamined Patent Publication No. 11 (1999)-232838, a leader pin (tape pulling-out tool) is affixed to the leading end portion of the magnetic tape to pull the magnetic tape out of the cartridge case. This leader pin is held and pulled out by a hold member of a drive unit provided on the side of a recording-reproducing apparatus, whereby forward winding or reverse winding of the magnetic tape is performed. Uniting of the leader pin and the magnetic tape can be performed by winding the magnetic tape on the outer periphery of the tape clamp shaft portion of the leader pin and then elastically fitting a clamp member with a C cross section onto the tape clamp portion to clamp the leading end portion of the magnetic tape therebetween.

In the structure in which the leader pin is affixed to the leading end of magnetic tape as described above, the coefficient of friction between the magnetic tape and the leader pin is low and therefore there is a possibility that because of insufficient clamping force, the leader pin will be disengaged from the magnetic tape.

More specifically, in order to reduce the sliding friction between the magnetic tape and the magnetic head, there are cases where the addition of a lubricating agent to the magnetic layer of the magnetic tape, or the coating of a lubricating agent on the top surface of the magnetic tape, is performed so that the coefficient of friction is reduced. The bottom surface of the magnetic tape is also treated in the same manner. In that case, the coefficient of friction between the leader pin, formed from stainless steel, etc., and the magnetic tape varies with the type of the magnetic tape. When this coefficient of friction is low, there are cases where the clamping force of the magnetic tape with respect to the leader pin by the engagment of the clamp member onto the leader pin is reduced.

The present invention has been made in view of the points mentioned above. Accordingly, it is a primary object of the present invention to provide a magnetic tape cartridge that is capable of enhancing the clamping force of the magnetic tape with respect to the leader pin to assure reliability.

The aforementioned leader member is detachably held in the cartridge case by a lock member, called a shaft holding portion, which has an engaging function, as shown in FIG. 6 of the aforementioned Japanese Unexamined Patent Publication No. 11 (1999)-232838. It is advantageous from the viewpoint of structural simplification to employ a spring member to hold the leader member.

Therefore, if there is provided a lock member with integral upper and lower hold portions which abut the upper and lower ends of the leader pin, the assembly of the leader pin to the upper and lower cases of the magnetic tape cartridge will be enhanced. However, in forming the lock member by stamping and bending a plate spring, the manufacturing precision is reduced depending on the configuration of the lock member and there is a problem that the holding force of the lock member with respect to the leader pin will vary.

For example, consider al lock member manufactured by pressing a plate spring such as that shown in FIGS. 15 and 16. In FIG. 15, a leader pin 5 affixed to the leading end of magnetic tape 6 is pulled in and out through an opening 10 formed in the side surfaces of an upper case (not shown) and a lower case 3. Inside the opening 10, upper and lower housing recesses 20 are formed in the bottom surface of the upper case and the top surface of the lower case 3, and the upper and lower end portions of the leader pin 5 are held in the housing recesses 20. Also, a tapered lower guide portion 21 is provided from the lower housing recess 20 toward the opening 10. A lock member 50, for detachably holding the leader pin 50 in the housing recesses 20, is symmetrical in the vertical direction thereof and formed into a U-shape, as shown in FIG. 16. The lock member 50 has amounting portion 50a, which is clamped between a mounting boss 51 erected in the bottom surface of the lower case 3 and the side wall 3b of the lower case 3, along the side wall 3b. The lock member 50 also has upper and lower elastic arm portions 50b, 50b extending from the forwardly curved rear portion of the mounting portion 50a toward the opening 10. The elastic arm portions 50b, 50b have leader-pin holding portions 50c, 50c at their outer ends, respectively. The leader-pin holding portions 50c, 50c abut the upper and lower end portions of the leader pin 5, respectively. Each leader-pin holding portion 50 is bent and has an outer inclined surface which is contacted and deformed by the leader pin 5 being inserted through the opening 10, and an inner inclined surface with which the leader pin is pressed against and held in the housing recess 20.

The lock member 50 is bent into a deeply curved U-shape by pressing a plate spring, so it is difficult to accurately form an angle a (see FIG. 16) which the mounting portion 50a forms with the elastic arm portion 50b. The amount of deformation in pressing and holding the leader pin 5 varies and therefore the holding force of the lock member 50 with respect to the leader pin 5 tends to vary. In addition, the deep U-shape pressing requires a plurality of press operations and increases the number of manufacturing steps. Since the deep U-shape pressing makes the length of the elastic arm portion 50b longer and thus increases the developed area, a large quantity of plate spring material is discarded after the stamping operation. Thus, the deeply U-shaped lock member 50 is disadvantageous in terms of cost. Furthermore, when a large number of lock members 50 are stored, they are stacked and engaged with one another, if each lock member 50 has a deeply curved U-shape. Since it is difficult to separate them from each other, there is the problem that feeding them serially by a part feeder may become difficult.

On the other hand, in the mounting structure of the lock member 50 in the cartridge case 4, in which the mounting portion 50a of the lock member 50 is disposed along the side wall 3b of the lower case 3 and clamped between the side wall 3b and the mounting boss 51, that part of the metal mold which molds the gap between the mounting boss 51 and the side wall 3b will become very thin, if the lock member 50 is made thin in order to obtain proper leader-pin holding force. Because of this, there is a possibility that the thickness-reduced part of the metal mold will be damaged by pressure produced when resin is injected. It is also difficult to manufacture a metal mold having thin portions. Particularly, when the mounting boss 51 is formed high, or long along the side wall 3b, the aforementioned phenomenon becomes conspicuous.

Furthermore, when the, plate-shaped lock member 50 is assembled into the cartridge case 4, depending on the locking structure there is a possibility that the upper case cannot be closed to the lower case 3. That is, when the lock member 50 is set to the lower case 3, and the upper case is stacked on the lower case 3, the lock member 50 tilts and cannot engage with the mounting boss 51 of the upper case and abut the lower end of the mounting boss 51, and therefore the upper case cannot be closed. Particularly, a space is required around the leader pin 5 so that a leader-pin pulling-out mechanism of a drive unit can enter through the opening 10 and hold the leader pin 5. The mounting boss 51 needs to be low in height so that it does not interfere with the leader-pin pulling-out mechanism, and the mounting boss also cannot be made high from the viewpoint of the metal-mold strength described above. Therefore, there is a possibility that problems associated with the aforementioned tilting will arise.

The present invention has been made in view of the points mentioned above. Accordingly, it is a secondary object of the present invention to provide a magnetic tape cartridge which is capable of holding the leader pin in a satisfactory manner by improving the manufacturing precision, mounting performance, etc., of the spring member which detachably holds the leader pin.

DISCLOSURE OF THE INVENTION

To achieve the primary object of the present invention mentioned above, there is provided a first magnetic tape cartridge comprising (1) a single reel with magnetic tape wound thereon; (2) a cartridge case for rotatably housing the single reel; (3) a leader pin having a tape clamp portion on which the magnetic tape is wound; and (4) a clamp member with a C cross section that has an axial slit; wherein the leader pin is affixed to a leading end of the magnetic tape by elastically fitting the clamp member onto the tape clamp portion of the leader pin; and wherein a sheet member for enhancing a coefficient of friction is interposed at least between the magnetic tape and the tape clamp portion.

The sheet member may be stuck to the magnetic tape. This case is preferable because the uniting operation of the magnetic tape and the leader pin is easily performed.

In addition, the sheet member may be provided without being stuck to the magnetic tape. In this case, when the magnetic tape is repeatedly bent near the leader pin, as the position at which the magnetic tape is clamped varies, durability is enhanced.

The sheet member refers to flexible ribbon-like members, such as plastic sheet (polyester, etc.), plastic film, foam sheet (elastomer, etc.), laminate film, laminate paper, etc. The sheet member is selected so that the coefficient of friction between the surface of the sheet member and the leader pin becomes higher than that between the surface of the magnetic tape and the leader pin.

According to the first magnetic tape cartridge, the sheet member for enhancing a coefficient of friction is interposed at least between the magnetic tape and the tape clamp portion when the leader pin is affixed to the leading end portion of the magnetic tape by fitting the clamp member onto the leader pin. Therefore, even when the friction coefficient between the surface of the magnetic tape and the leader pin is low, the interposition of the sheet member enhances the friction coefficient between the sheet member and the leader pin and increases the clamping force of the magnetic tape with respect to the leader pin. As a result, disengagement of the leader pin from the magnetic tape can be prevented, whereby reliability can be assured.

Furthermore, the interposition of the sheet member can reinforce the magnetic tape near the tape clamp portion of the leader pin when the leader pin is pulled out and in by a drive unit.

To achieve the second object of the present invention mentioned above, there is provided a second magnetic tape cartridge comprising (1) a single reel with magnetic tape wound thereon; (2) a cartridge case, which comprises an upper case and a lower case, for rotatably housing the single reel; (3) a leader pin affixed to a leading end of the magnetic tape to pull the magnetic tape out of the cartridge case; and (4) a lock member, formed from a plate spring, for detachably locking and holding an upper end portion and a lower end portion of the leader pin; wherein the lock member comprises a mounting portion which is held by the upper and lower cases, and elastic arm portions extending from the mounting portion toward the leader pin and engageable with the upper and lower end portions of the leader pin; and wherein an interior angle that the mounting portion forms with the elastic arm portion is an obtuse angle.

The interior angle that the mounting portion of the aforementioned lock member forms with the elastic arm portion of same is 135° or greater.

Further, an alternate embodiment of this second magnetic tape cartridge is characterized by a lock member, formed from a plate spring, for detachably locking and holding an upper end portion and a lower end portion of the leader pin; upper and lower spring type lock-member installing portions, provided in the upper and lower cases of the cartridge case, for holding the lock member; wherein the lock member comprises a mounting portion which is held by the upper and lower cases, and elastic arm portions extending from the mounting portion toward the leader pin and engageable with the upper and lower end portions of the leader pin; and wherein the upper and lower spring type lock-member installing portions hold the lock member at positions away from side walls of the lower and upper cases to the inside. It is preferable from the viewpoint of metal-mold strength that the upper and lower lock-member installing portions be formed at positions 0.4 mm or greater away from the side walls of the lower and upper cases.

In the alternate embodiment of the second magnetic tape cartridge of the present invention described above, the mounting portion of the lock member has upper and lower engagement recesses at upper and lower edges thereof. The upper and lower lock-member installing portions have upper and lower protrusions. The lock member is positioned and held by fitting the upper and lower protrusions into the upper and lower engagement recesses.

In addition, it is preferable that the lock-member installing portion be provided with inclined surfaces for guiding the lock member to the protrusion. It is also preferable that the lock member be provided with guide portions engageable with the inclined surfaces of the lock-member installing portion. By this structure, the engagement between the lock member and the lock-member installing portion can be facilitated.

In the alternate embodiment of the second magnetic tape cartridge of the present invention, it is preferable that the upper and lower lock-member installing portions have a tilt regulating portion for holding an edge, opposite from the elastic arm portions, of the mounting portion of the lock member in an erect posture. By this structure, tilting of the lock member can be prevented.

Note that when the lock member such as that described above is assembled into the cartridge case, the upper and lower cases of the cartridge case can be fastened together by tightening small screws inserted in holes formed in the upper case. In this case, the lock member is installed in the lower case. After the upper case is stacked on the lower case, they are assembled without inverting the cartridge case up and down. By this method, the assembly operation can be efficiently performed.

According to the second magnetic tape cartridge of the present invention, an interior angle that the mounting portion of the lock member forms with the elastic arm portion of the lock member is an obtuse angle. Therefore, deep curve pressing is unnecessary, manufacturing precision is enhanced, and the amount of deformation in pressing and holding the leader pin becomes constant and therefore stable leader-pin locking force is obtained. In addition, the pressing operation becomes easy and manufacturing steps are simplified. The length of the elastic arm portion is short, so the developed area is reduced and costs are decreased. Furthermore, even if a large number of lock members are stored, they are less likely to engage each other and can be serially fed by a part feeder.

According to an alternate embodiment of the second magnetic tape cartridge of the present invention, the upper and lower spring type lock-member installing portions hold the lock member at positions away from side walls of the lower and upper cases to the inside. Therefore, even if the lock member is made thin, that part of the metal mold which molds the wall surface of the cartridge case will not become thin and therefore the metal mold can be easily manufactured and damage to the metal mold can be prevented.

If engagement recesses for fitting the protrusions of the spring type lock-member installing portion are provided in the upper and lower edges of the mounting portion of said lock member, longitudinal positioning of the lock member can be simultaneously performed and therefore the accuracy of position between the lock member and the leader pin can be enhanced.

Furthermore, if the tilt regulating portion for holding the lock member in an erect posture is provided in said spring type lock-member installing portion, tilting of the lock member can be prevented, for example, when the lock member is installed in the lower case and the upper case is stacked on the lower case, while assuring a space for a leader-pin pulling-out mechanism of a drive unit. Thus, satisfactory assembly performance can be assured.

If screw holes are formed in the top surface of the upper case so that assembly can be performed without inverting the cartridge case up and down, assembly performance is further enhanced.

BRIEF DESCRIPTION OF THE DRAWINGS

The present invention will be described in further detail with reference to the accompanying drawings wherein.

BEST MODE FOR CARRYING OUT THE INVENTION

Figure 1:
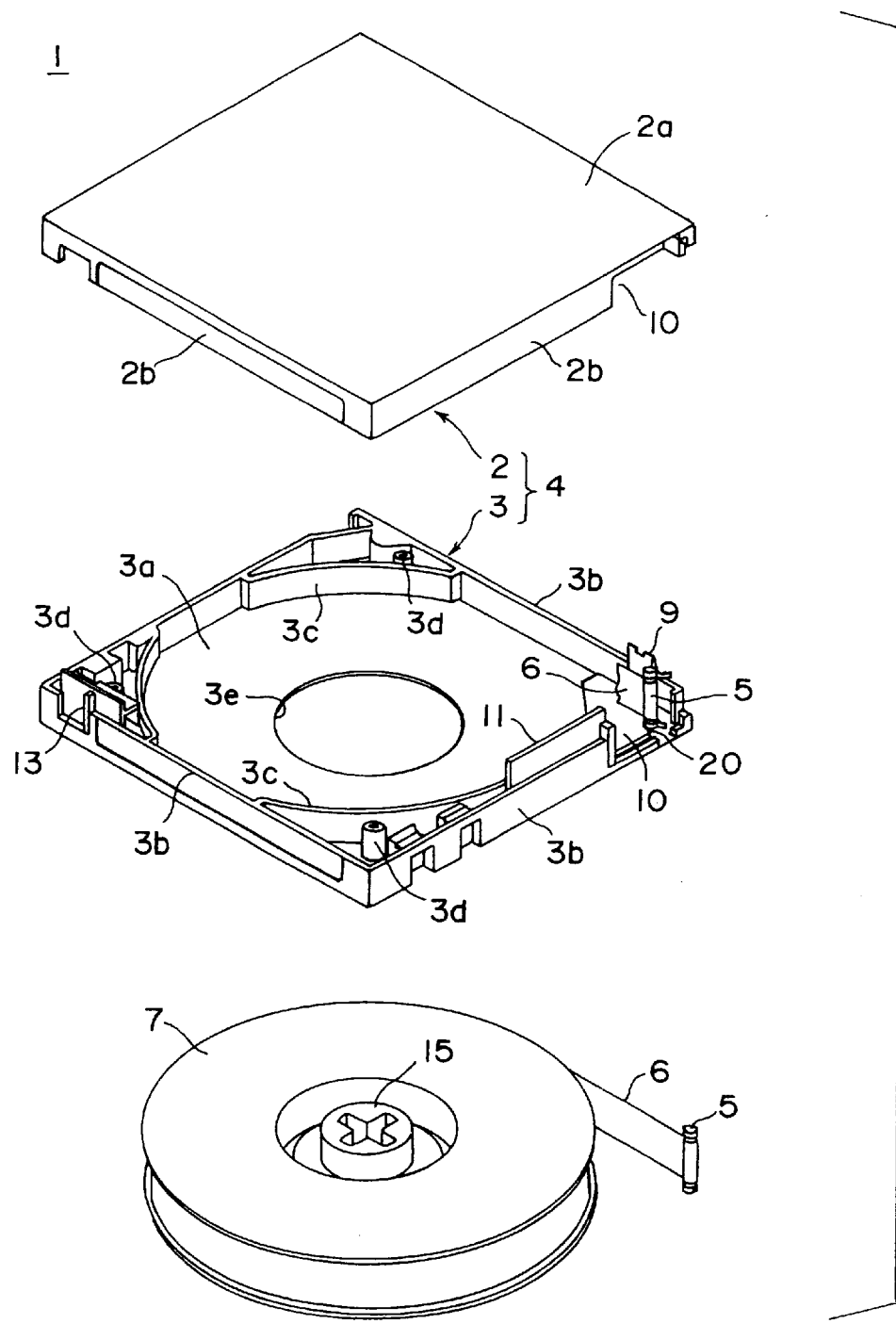
FIG. 1 is an exploded perspective view of a magnetic tape cartridge according to a first embodiment of the present invention.

Referring now in greater detail to the drawings and initially to FIG. 1, there is shown an exploded view of a magnetic tape cartridge 1 in accordance with a first embodiment of the present invention. The magnetic tape cartridge 1 has a cartridge case 4, which is formed by fastening an upper case 2 and a lower case 3 together with small screws or the like. Within the cartridge case 4, al single reel 7 with magnetic tape 6 wound thereon is rotatably housed. The leading end portion of the magnetic tape 6 is affixed to a leader pin 5. The upper and lower cases 2 and 3 have side walls in which an opening 10 is formed to pull the magnetic tape 6 out of the cartridge case 4. Near this opening 10, there is provided a slide door 11 that is opened and shut. The slide door 11 is urged closed by elastic means (not shown).

During non-use of the magnetic tape cartridge 1, the upper and lower ends of the leader pin 5 affixed to the leading end of the magnetic tape 6 are held in upper and lower housing recesses 20, 20 formed near the opening 10, with the magnetic tape 6 completely wound on the reel 7.

The leader pin 5 is held and pulled in by a drive unit of a recording-reproducing apparatus, which uses the magnetic tape cartridge 1, so that the magnetic tape 6 is introduced into a tape traveling path within the recording-reproducing apparatus. A clamp member 55 to be described below(see FIGS. 2 and 3) is fitted on the leader pin 5 to clamp the magnetic tape 6 therebetween. Also, a lock member 9 consisting of a plate spring is installed to detachably hold the upper and lower end portions of the leader pin 5 in the upper and lower housing recesses 20, 20.

In FIG. 1, the upper and lower cases 2, 3 are formed into a generally rectangular shape and provided with side walls 2b, 3b along the perimeters of the top wall 2a and the bottom wall 3a. The upper and lower cases 2, 3 are further provided with arc-shaped inner walls 3c (arc-shaped inner walls for the upper case 2 are not shown) along the outer periphery of the reel 7. The lower case 3 has four boss portions 3d (a boss portion 3d near the opening 10 is hidden behind the slide door 11) between the side walls 3b and the inner walls 3c. Similarly, the upper case 2 has four boss portions (not shown). The lower case 3 is fastened to the upper case 2 by abutting the boss portions 3d of the lower case 3 with the boss portions of the upper case 2 and then tightening small screws through the bottom surface of the lower case 3. Note that tightening of the small screws with respect to the boss portions 3d may be performed through the top surface of the upper case 2, as described later.

The center portion of the lower case 3 also has a center hole 3e so that the reel 7 can be driven by a driving shaft of the aforementioned drive unit. A write protector member 13 is slidably disposed in the rear end portion of the cartridge case 4. The center portion of the reel 7 is provided with a rotation regulating mechanism 15 for restricting rotation of the reel 7 during non-use of the magnetic tape cartridge 1.

In addition to the above, although not shown, the reel 7 includes a reel plate mounted on the central portion of the bottom surface thereof, the reel plate being used for attracting and holding magnetic type rotation means. The radially outer portion of the bottom surface of the reel 7 has a reel gear that meshes with the driving gear of the rotation means. If the reel gear and the driving gear mesh with each other, the rotation regulating mechanism 15 performs an unlocking operation and frees the reel 7 to rotate.

Figure 2:
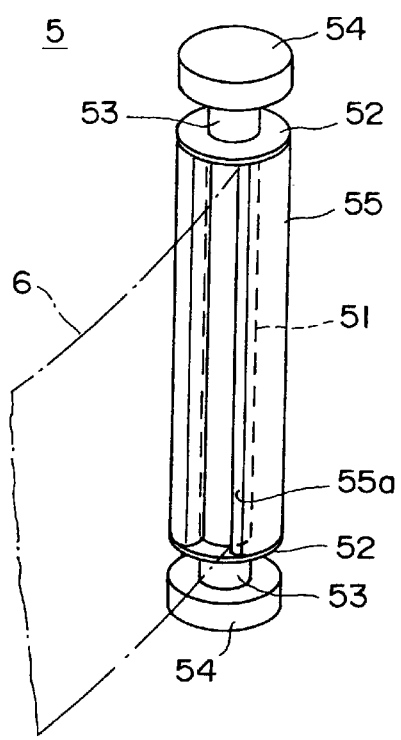
FIG. 2 is a perspective view showing the state in which the clamp member of FIG. 1 is fitted on the leader pin of FIG. 1.
Figure 3:
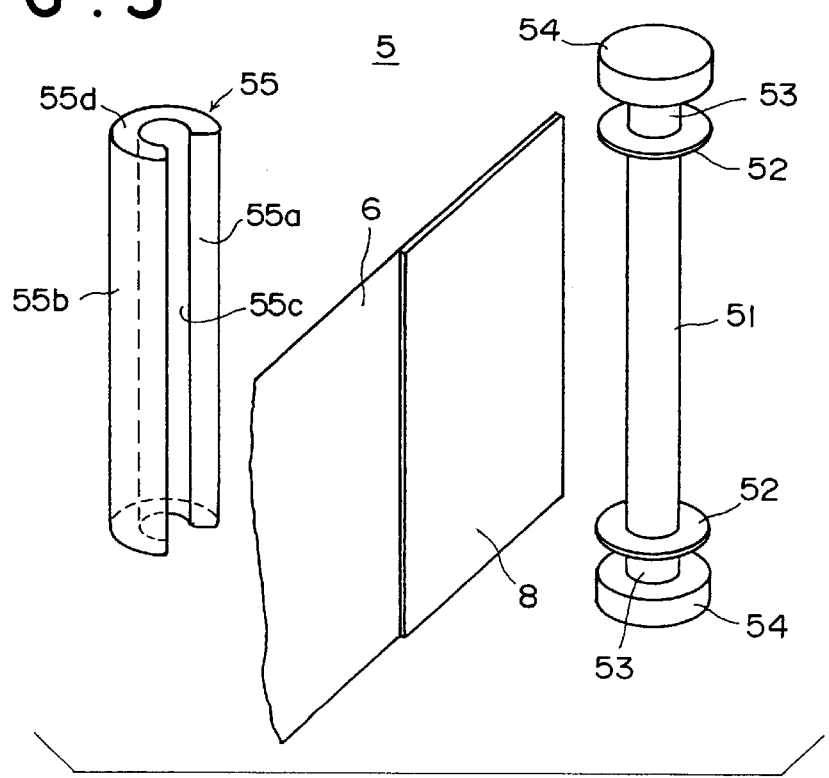
FIG. 3 is a perspective view of the state before the leading end of the magnetic tape of FIG. 1 and the leader pin are joined together.

As illustrated in FIGS. 2 and 3, the leader pin 5 has a tape clamp shaft portion 51 at its central portion. The leading end portion of the magnetic tape 6 is wound on the tape clamp portion 51 and is clamped by fitting a C cross-section clamp member 55 onto the tape clamp portion 51. The leader pin 5 also has upper and lower flange portions 52, 52 at the upper and lower ends of the tape clamp portion 51 and further has narrow engagement portions 53, 53 outside the upper and lower flange portions 52, 52. The engagement portions 53, 53 extend axially and are engaged and held by the recording-reproducing apparatus. Furthermore, the leader pin 5 has locking portions 54, 54 at the upper and lower ends thereof.

The leader pin 5 is formed, for example, by cutting a shaft of metal such as stainless steel, etc., and the length of the tape clamp portion 51 is set so that it equals the width of the magnetic tape 6.

The clamp member 55 is molded from resin and has an axial length equivalent to the length of the tape clamp portion 51 of the leader pin 5. The clamp member 55 is formed into a C-shape in cross section and provided with a slit 55a extending axially over the overall length. The clamp member 55 consists of an outer periphery 55b, an inner periphery 55c, and end faces 55d. The width of the slit 55a in the clamp member 55 is narrower than the outside diameter of the tape clamp portion 51 of the leader pin 5 so that the clamp member 55 can be elastically fitted on the leader pin 5.

Figure 4:
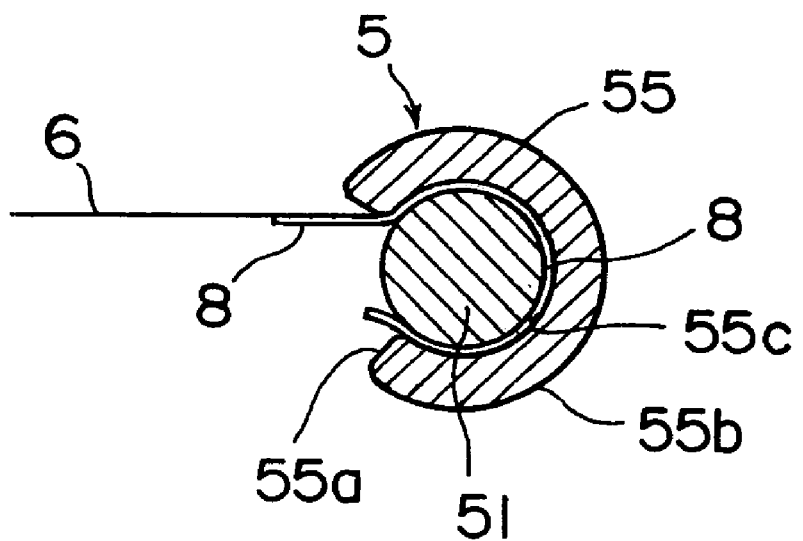
FIG. 4 is a cross sectional view showing the state in which the magnetic tape and the leader pin are joined together.

As illustrated in FIGS. 3 and 4, the leading end portion of the magnetic tape 6 is affixed to the tape clamp portion 51 through a sheet member 8 by the clamp member 55 in order to enhance the coefficient of friction between the magnetic tape 6 and the tape clamp portion 51. This sheet member 8 has adhesive property and is stuck to one side of the magnetic tape 6. With the clamp member 55 fitted on the tape clamp portion 51 of the leader pin 5, the surface of the sheet member 8 contacts the surface of the tape clamp portion 51 of the leader pin 5, and the exterior surface of the magnetic tape 6 contacts the inner periphery 55c of the clamp member 55.

As the sheet member 8, al flexible ribbon-like member, which has an adhesive layer on one side thereof, such as plastic sheet (polyester, etc.), form sheet, laminate film, laminate paper, etc., is used. The sheet member 8 is selected so that the coefficient of friction between the surface of the sheet member 8 and the leader pin 5 is higher than that between the surface of the magnetic tape 6 and the leader pin 5.

According to the first embodiment, the leader pin 5 is affixed to the leading end portion of the magnetic tape 6, by fitting the clamp member 55 on the tape clamp portion 51 of the leader pin 5 through the sheet member 8. Therefore, the friction coefficient between the sheet member 8 and the leader pin 5 becomes higher and the clamping force of the magnetic tape 6 is increased. The increased clamping force prevents the magnetic tape cartridge 1 from being disabled due to disengagement of the leader pin 5 from the magnetic tape 6. In addition, since the sheet member 8 with adhesive property is stuck to the magnetic tape 6 beforehand, the leader pin 5 can be easily attached to the leading end portion of the magnetic tape.

As a modification of the first embodiment, the sheet member 8 may have no adhesive property, although the details are not shown. That is, this sheet member 8 is interposed between the magnetic tape 6 and the leader pin 5 without being stuck to the magnetic tape 6. The friction coefficient of the sheet member 8 is high as in the first embodiment. As a result, the clamping force of the magnetic tape 6 with respect to the leader pin 5 is increased and prevents disengagement between the magnetic tape 6 and the leader pin 5.

There are cases where a hold block of the drive unit holding the leader pin 5, as it is, is fitted on a winding reel of the drive unit and driven to rotate. If, in that case, the magnetic tape 6 is repeatedly bent near the leader pin 5 at an acute angle, the magnetic tape 6 will be degraded at the bent portion and a problem of durability will arise. However, in the modification of the first embodiment, the position at which the magnetic tape 6 clamps the leader pin 5 will shift slightly due to the sheet 8 being disposed in a non-adhesive manner and therefore a position at which the magnetic tape 6 is bent will change. Thus, the magnetic tape 6 is prevented from being bent at the same position and is enhanced in durability.

While, in the first embodiment, the sheet member 8 is interposed between the magnetic tape 6 and the outer periphery of the leader pin 5, in addition to this another sheet member may be interposed between the Magnetic tape 6 and the inner periphery of the clamp member 55.

In addition, the clamp member 55 is not limited to a resin-molded product, but may be molded from other materials such as a thin metal plate, etc.

A tape magnetic cartridge will hereinafter be described according to a second embodiment of the present invention with reference to FIGS. 5 to 9.

The magnetic tape cartridge 1 has a cartridge case 4, which is formed by fastening an upper case 2 and a lower case 3 together with small screws or the like. Within the cartridge case 4, a single reel 7 with magnetic tape 6 wound thereon is rotatably housed. The leading end portion of the magnetic tape 6 is affixed to a leader pin 5. The upper and lower cases 2 and 3 have side walls in which an opening 10 is formed to pull the magnetic tape 6 out of the cartridge case 4. Near this opening 10, there is provided a sliding door 11 that is opened and shut. The sliding door 11 is urged closed by elastic means (not shown) and slidable along a grooved door rail 12 (see FIG. 6).

During non-use of the magnetic tape cartridge 1, the upper and lower ends of the leader pin 5 affixed to the leading end of the magnetic tape 6 are held in upper and lower housing recesses 20, 20 formed near the opening 10, with the magnetic tape 6 completely wound on the reel 7. The upper and lower housing recesses 20, 20 are continuous to upper and lower insertion guide portions (guide surfaces) 21, 21, which are formed into lead-in structure toward the opening 10 so that the upper and lower ends of the leader pin 5 can be guided to the upper and lower housing recesses 20, 20.

The leader pin 5 is held and pulled in by the drive unit of a recording-reproducing apparatus which uses the magnetic tape cartridge 1, so that the magnetic tape 6 is introduced into a tape traveling path within the recording-reproducing apparatus. A lock member 9 consisting of a plate spring is installed to detachably hold the upper and lower end portions of the leader pin 5 in the upper and lower housing recesses 20, 20.

Figure 5:
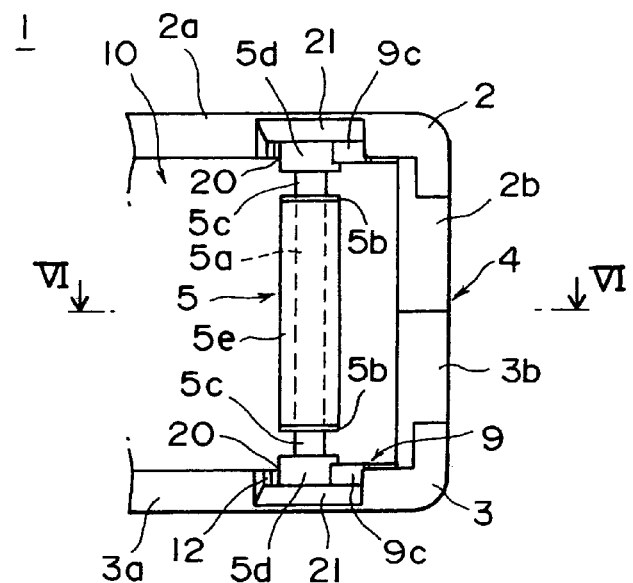
FIG. 5 is a fragmentary front view of a magnetic tape cartridge according to a second embodiment of the present invention, the slide door having been opened to show the leader pin that is affixed to the leading end portion of magnetic tape.
Figure 6:
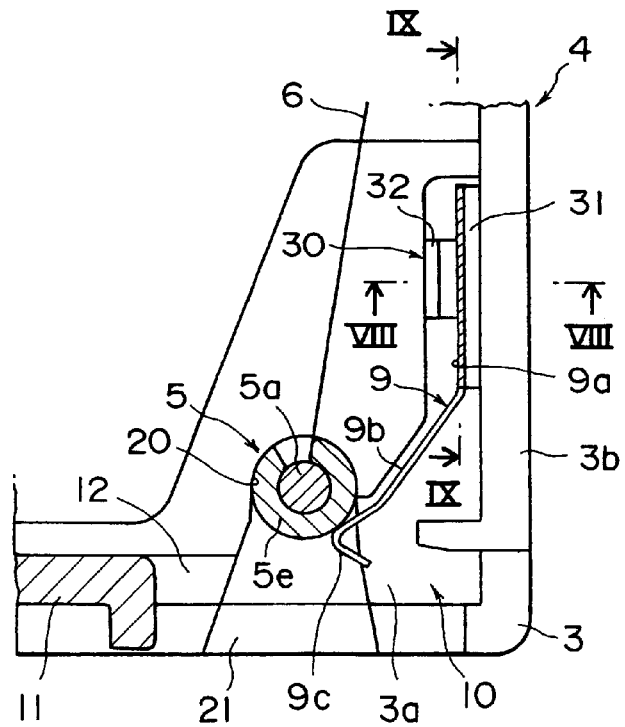
FIG. 6 is a sectional plan view taken substantially along line VI—VI of FIG. 5.
Figure 7:
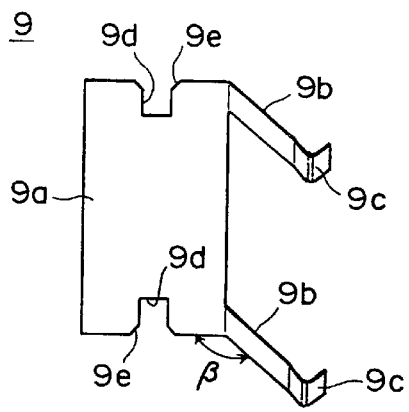
FIG. 7 is a perspective view of the lock member of the magnetic tape cartridge of FIG. 5.
Figure 8:
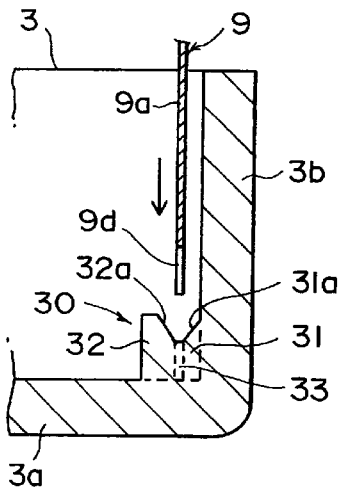
FIG. 8 is a sectional view of a lock-member installing portion taken substantially along line VIII—VIII of FIG. 6.
Figure 9:
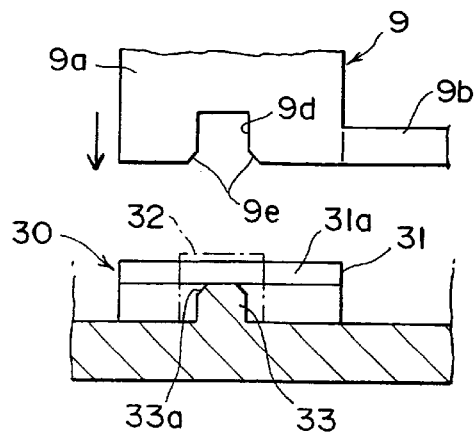
FIG. 9 is a sectional view of the lock-member installing portion taken substantially along line IX—IX of FIG. 6.

As illustrated in FIGS. 5 and 6, the leader pin 5 has a tape clamp shaft portion 5a at it scentral portion. The leading end portion of the magnetic tape 6 is wound on the tape clamp portion 5a and is clamped by fitting a C cross-section clamp member 5e onto the tape clamp portion 5a. The leader pin 5 also has upper and lower flange portions 5b, 5b at the upper and lower ends of the tape clamp portion 5a and further has narrow engagement portions 5c, 5c outside the upper and lower flange portions 5b, 5b. The engagement portions 5c, 5c extend axially and are engaged and held by the recording-reproducing apparatus. Furthermore, the leader pin 5 has locking portions 5d, 5d at the upper and lower ends thereof. This leader pin 5 is formed, for example, by cutting a shaft of metal such as stainless steel, etc., and the length of the tape clamp portion 5a equals the width of the magnetic tape 6.

The clamp member 5e is molded from resin and has an axial length equivalent to the length of the tape clamp portion 5a of the leader pin 5. The clamp member 5e is formed into a C-shape in cross section and provided with a slit (FIG. 6) extending axially over the overall length. The clamp member 5e is elastically fitted on the outer periphery of the tape clamp portion 5a of the leader pin 5 through the axial slit.

Next, a description will be given of the lock member 9 for holding the upper and lower end portions of the leader pin 5 in the upper and lower housing recesses 20, 20, and the structure for mounting said lock member 9.

The lock member 9 has a mounting portion 9a in the form of a generally rectangular plate. With the upper case 2 and the lower case 3 stacked together, the mounting portion 9a is engaged and held by upper and lower lock-member installing portions 30, which are provided near the side walls 2b, 3b of the upper and lower cases 2, 3. Note that although only the lower lock-member installing portion 30 of the lower case 3 is shown, the upper lock-member installing portion 30 of the upper case 2 is symmetrical in shape with the lower lock-member installing portion 30. The lock member 9 also has a pair of elastic upper and lower arm portions 9b, 9b extending obliquely from the upper and lower end portions of the mounting portion 9a toward the leader pin 5. The upper and lower arm portions 9b, 9b have upper and lower pin-locking portions 9c, 9c at their outer ends, respectively. The elastic upper and lower pin-locking portions 9c, 9c abut the outer peripheries of the upper and lower locking portions 5d, 5d of the leader pin 5, respectively. Each pin-locking portion 9c is bent so that it projects toward the leader pin 5. If the leader pin 5 is inserted through the opening 10, the leader pin 5 is brought into contact with the outer inclined surface of the bent portion of each pin-locking portion 9c, and each elastic arm portion 9b is elastically deformed. As a result, the upper and lower locking portions 5d, 5d of the leader pin 5 are pressed against and held within the upper and lower housing recesses 20, 20 by the inner inclined surfaces of the bent portions of the upper and lower pin-locking portions 9c, 9c. Furthermore, the top and bottom edges of the mounting portion 9a of the lock member 9 are provided with upper and lower engagement recesses 9d, 9d.

Figure 13:
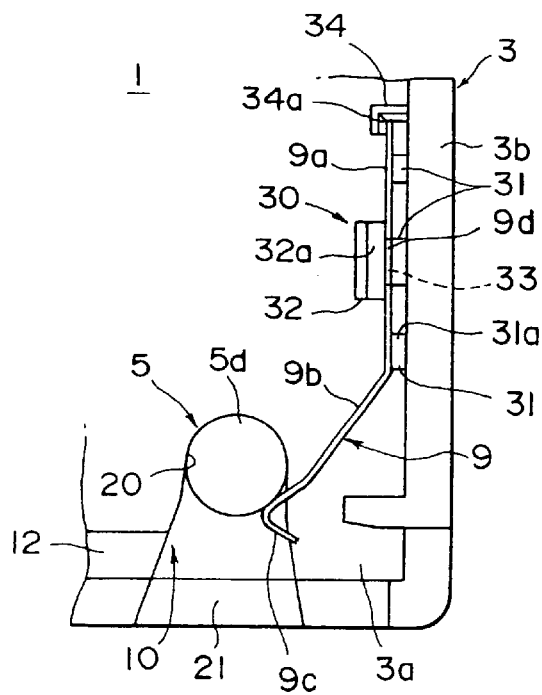
FIG. 13 is a fragmentary plan view of a modification of the magnetic tape cartridge shown in FIG. 11, the upper case of the cartridge having been removed to show components near the opening of the cartridge.

An interior angle $\beta$ (see FIG. 7) that the mounting portion 9a forms with the bent elastic arm portion 9b is formed as an obtuse angle, preferably 135° or greater. In relation to the length of the elastic arm portion 9b, etc., the lock member 9 is as thin as 0.2 to 0.3 mm in order to obtain an appropriate leader-pin locking force. Note that a lock member 50 shown in FIG. 13 is about 0.4 mm in thickness. Also, the upper and lower elastic arm portions 9b, 9b may be provided so that they are connected at their proximal portions.

The upper and lower lock-member installing portions 30 of the upper and lower cases 2, 3, which hold the lock member 9, are provided so that they hold the lock member 9 at positions away from the side walls 2b, 3b of the upper and lower cases 2, 3, preferably at positions 0.4 mm or more away from the side walls 2b, 3b from the standpoint of metal-mold strength.

The lower lock-member installing portion 30 is equipped with a first support portion 31, and a second support portion 32 facing the first support portion 31. Note that the upper lock-member installing portion (not shown) is formed the same as the lower lock-member installing portion 30. The first support portion 31 is formed integrally with the side wall 3b of the lower case 3 and projected in the form of a flat plate from the side wall 3b. The second support portion 32 is projected from the bottom wall 3a of the lower case 3. The amount that the first support member 31 projects from the side wall 3b is set to the dimension of the aforementioned hold position. The gap between the first support portion 31 and the second support portion 32 is formed to the thickness of the mounting portion 9a of the lock member 9 or greater. The mounting portion 9a of the lock member 9 is inserted into the gap between the first support portion 31 and the second support portion 32.

The second support portion 32 is narrower in width than the first support portion 31 (see FIG. 9) but higher in height than the first support portion 31. The top surfaces of the first support portion 31 and the second support portion 32 are formed into inclined surfaces 31a, 32a (see FIG. 8) which become lower in height toward the gap therebetween. The lower end portion of the lock member 9 is guided to the gap between the first and second support portions 31 and 32 by the inclined surfaces 31a, 32a.

Between the first support portion 31 and the second support portion 32, a lower protrusion 33 (see FIG. 9) is formed so that it protrudes from the bottom surface 3a of the lower case 3. Similarly, an upper protrusion (not shown) is formed in the upper case 2. The longitudinal width of the lower protrusion 33 is narrower than the width of the second support portion 32 of the lock-member installing portion 30. Across the protrusion 33, there are formed front and rear gaps into which the lock member 9 is inserted. The width of the lower protrusion 33 equals the width of the engagement recess 9d in the lower edge of the mounting portion 9a of the lock member 9 so that the engagement recess 9d is fitted on the protrusion 33. Furthermore, the protrusion 33 has inclined guide surfaces 33a at the top edge thereof. Similarly, the engagement recess 9d of the lock member 9 has inclined guide portions 9e so that the engagement recess 9d is easily fitted on the protrusion 33.

With the mounting structure mentioned above, as shown in FIGS. 8 and 9, the lower engagement recess 9d in the mounting portion 9a of the lock member 9 is easily fitted on the lower protrusion 33 between the first support portion 31 and the second support portion 32 of the spring type lower lock-member installing portion 30 of the lower case 3, while the lower engagement recess 9d is being guided by the inclined surfaces 31a, 32a, 33a and the guide portions 9e. After other components, such as the reel 7, etc., are assembled within the lower case 3, the upper case 2 is stacked on the lower case 3 so that the upper lock-member installing portion 30 of the upper case 2 engages with the mounting portion 9a of the lock member 9. With the upper case 2 and the lower case 3 stacked together, they are assembled by tightening small screws.

In assembling the upper case 2 and the lower case 3, the upper case 2 and the lower case 3 are vertically positioned by the spring type lock-member installing portions 30 and longitudinally positioned by engagement between each protrusion 33 and each engagement recess 9d. As a result, the contact positions between the upper and lower pin-locking portions 9c, 9c of the lock member 9 and the upper and lower locking portions 5d, 5d of the leader pin 5 are assured.

Figure 10:
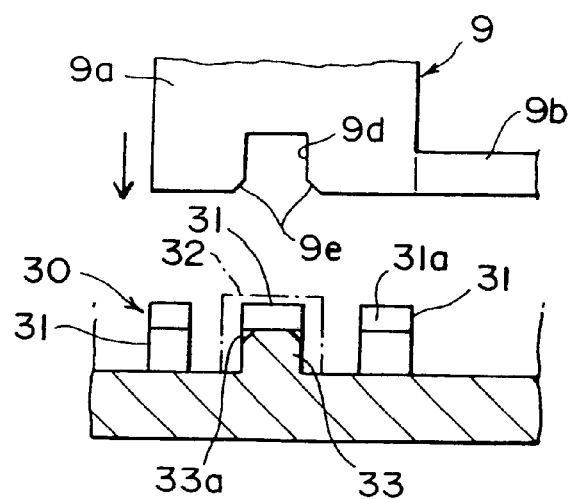
FIG. 10 is a sectional view of a modification of the lock-member installing portion of FIG. 9.

Note that the first support portion 31 of the spring type lock-member installing portion 30 may be three separate support portions, as shown in FIG. 10. This structure is advantageous from the viewpoint of metal-mold strength.

Figure 11:
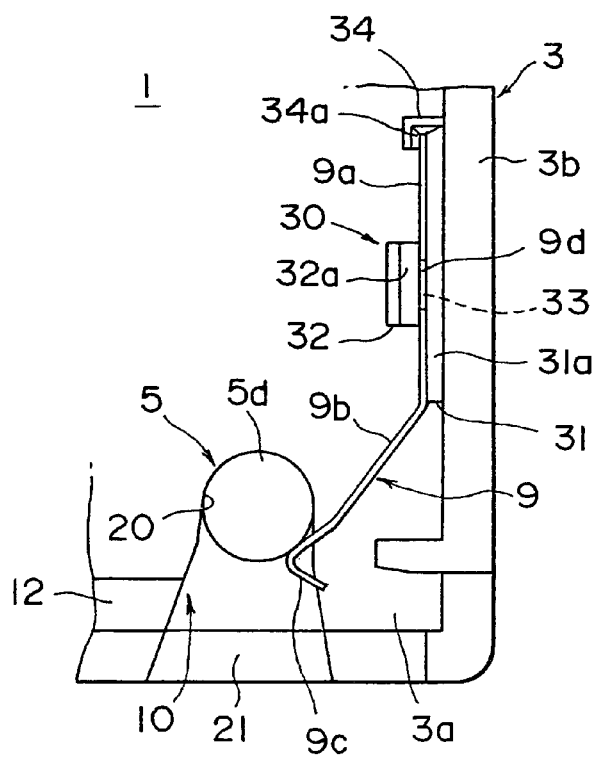
FIG. 11 is a fragmentary front view of a magnetic tape cartridge according to an alternate embodiment of the present invention, the upper case of the cartridge having been removed to show components near the opening of the cartridge.
Figure 12:
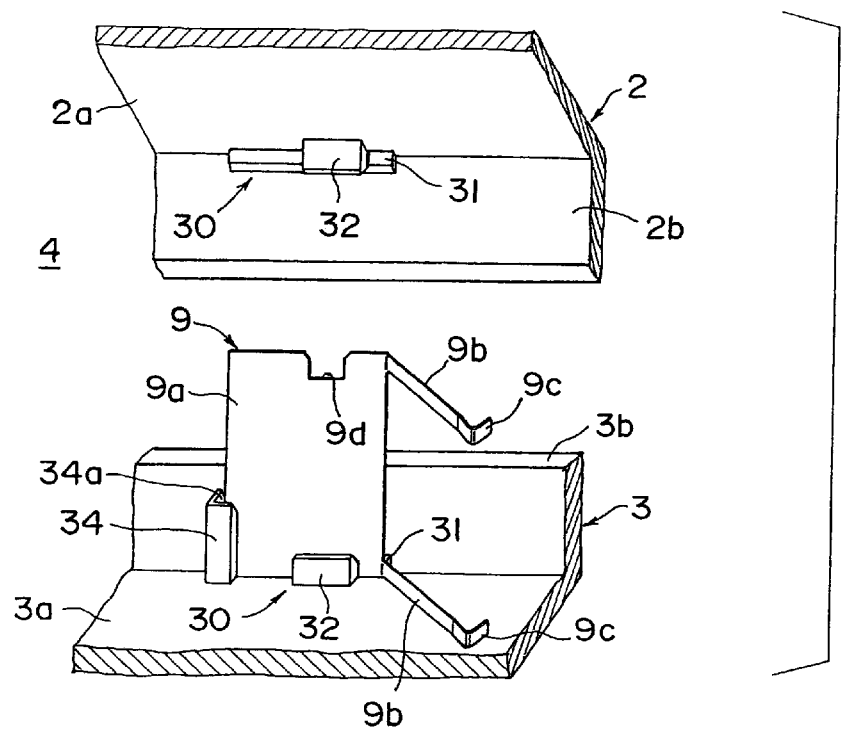
FIG. 12 is a fragmentary perspective view showing the state in which the lock member of FIG. 11 is installed.

FIGS. 11 and 12 illustrate a magnetic tape cartridge constructed according to an alternate embodiment of the present invention. The lock member 9 is formed in the same way as the aforementioned embodiments, but the spring type lock-member installing portion 30 differs in construction from the spring type lock-member installing portion 30 described above.

The lower spring type lock-member installing portion 30 of the lower case 3, as in the case described above, has the first support portion 31, the second support portion 32, and the protrusion 33. The spring type lock-member installing portion 30 further has a tilt regulating portion 34 on the depth side of the first support portion 31. The tilt regulating portion 34 is used for holding the edge, opposite from the elastic arm portion 9b, of the lock member 9 in an erect posture. The upper spring type lock-member installing portion 30 of the upper case 2 similarly has the first support portion 31, the second support portion 32, and the protrusion 33, but does not have the tilt regulating portion 34.

The tilt regulating portion 34 extends vertically in the form of a rib and is formed higher than the first support portion 31 and the second support portion 32. The interior surface of the tilt regulating portion 34 extends upward so that a tilt regulating gap equivalent to the thickness of the lock member 9 is formed between the interior surface and the first support portion 31, and holds the lock member 9 vertically. The tilt regulating portion 34 has an inclined guide face 34a at its top end so that the lock member 9 can be readily inserted into the tilt regulating gap.

In this alternate embodiment, when the lock member 9 is installed in the lock-member installing portion 30 of the lower case 3, tilting of the lock member 9, particularly tilting toward the inside of the case, is regulated by the tilt regulating portion 34. Therefore, the engagement of the lock member 9 with the lock-member installing portion 30 of the upper case 2 in stacking the upper case 2 on the lower case 3 is performed with reliability, and the workability is enhanced.

Figure 14:
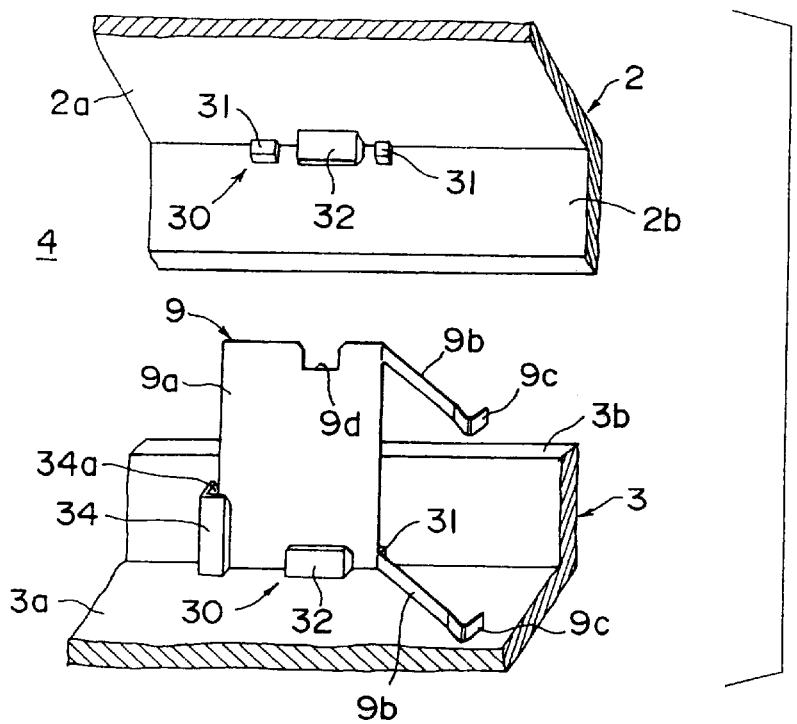
FIG. 14 is a fragmentary perspective view showing the state in which the lock member of FIG. 13 is installed.
Figure 15:
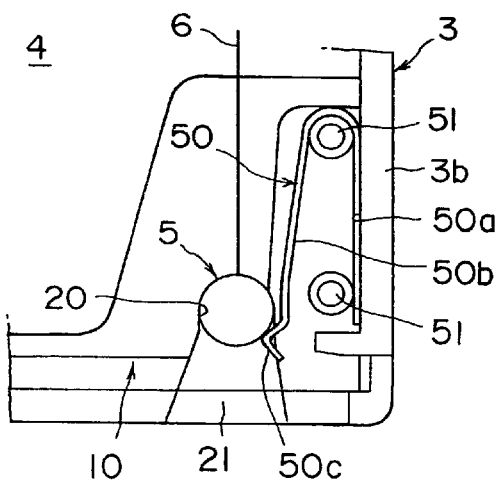
FIG. 15 is a fragmentary plan view of a conventional magnetic tape cartridge, the upper case of the cartridge having been removed to show components near the opening of the cartridge.
Figure 16:
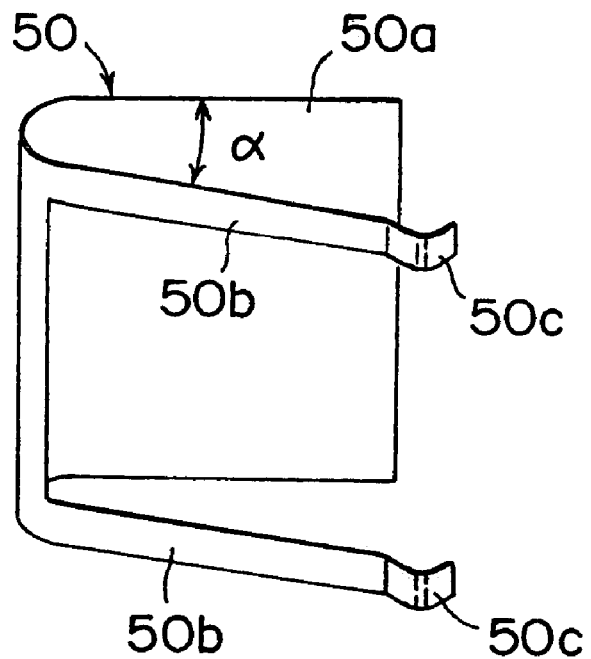
FIG. 16 is a perspective view showing the lock member of FIG. 15.

FIGS. 13 and 14 illustrate a modification of the alternate embodiment illustrated in FIGS. 11 and 12. The first support portion 31 of the lock-member installing portion 30 in FIGS. 11 and 12 are divided into three separate support portions 31. Particularly, the separate support portions 31 of the lower case 3 are disposed at positions away from the tilt regulating portion 34. This structure has an advantage of assuring metal-mold strength when molding the support portions 31.

In the aforementioned embodiments, the lower case 3 is first placed with the top upward. Then, the lower end of the lock member 9 is inserted into the lock-member installing portion 30 of the lower case 3. Next, the upper case 2 is stacked on the lower case 3. However, conversely, with the upper case 2 upward, the lock member 9 may be installed and the lower case 3 stacked on the upper case 2. In this case the tilt regulating portion 34 needs to be provided in the upper case 2.

Also, in the case where the lock member 9 is installed in the lower case 3 having screw holes in the bottom surface thereof, the lower case 3 is placed with the top upward and then the upper case 2 is stacked on the lower case 3. After that, the cartridge case 4 is inverted up and down, and small screws are tightened. However, if the upper case 2 has screw holes in the top surface, small screws can be tightened without inverting the cartridge case 4 up and down and the assembly step can be simplified. Therefore, it is preferable to provide screw holes according to an assembly step.

While the present invention has been described with reference to the preferred embodiments thereof, the invention is not to be limited to the details given herein, but may be modified within the scope of the invention hereinafter claimed.

What is claimed is:

1. A magnetic tape cartridge comprising:
   a single reel with magnetic tape wound thereon;
   a cartridge case, which comprises an upper case and a lower case, for rotatably housing said single reel;
   a leader pin affixed to a leading end of said magnetic tape to pull said magnetic tape out of said cartridge case;
   a lock member, formed from a plate spring, for detachably locking and holding an upper end portion and a lower end portion of said leader pin; and
   upper and lower lock-member installing portions, provided in said upper and lower cases of said cartridge case, for holding said lock member;
   wherein said lock member comprises a mounting portion which is held by said upper and lower cases, and elastic arm portions extending from said mounting portion toward said leader pin and engageable with said upper and lower end portions of said leader pin;
   and wherein said upper and lower lock-member installing portions hold said lock member at positions 0.4 mm or greater away from side walls of said lower and upper cases.

2. The magnetic tape cartridge as set forth in claim 1, wherein
   the mounting portion of said lock member has upper and lower engagement recesses at upper and lower edges thereof;
   said upper and lower lock-member installing portions have upper and lower protrusions; and
   said lock member is positioned and held by fitting said upper and lower protrusions into said upper and lower engagement recesses.

3. The magnetic tape cartridge as set forth in claim 1, wherein one of said upper and lower lock-member installing portions has a tilt regulating portion for holding an edge, opposite from said elastic arm portions, of said mounting portion of said lock member in an erect posture.

* * * * *